D. Stoner,
Pumping App's.
No. 104,374. Patented June 14, 1870.

Witnesses:

David Stoner, Inventor
by Job Abbott, Attorney

United States Patent Office.

DAVID STONER, OF CANTON, OHIO.

Letters Patent No. 104,374, dated June 14, 1870.

---

IMPROVEMENT IN PUMPING-APPARATUS.

---

The Schedule referred to in these Letters Patent and making part of the same

---

*To all whom it may concern:*

Be it known that I, DAVID STONER, of Canton, Stark county, Ohio, have invented certain new and useful Improvements in Pumping Apparatus; and I do hereby declare that the following is a full, clear, and exact description of my invention, reference being had to the accompanying drawing forming a part of this specification, and to the letters of reference marked thereon, of which drawing—

Figure 1:
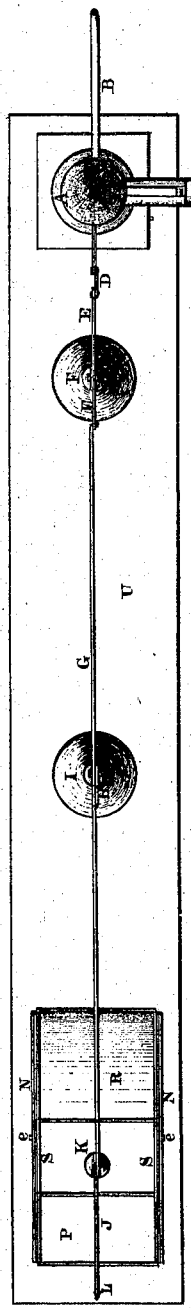
Figure 2:
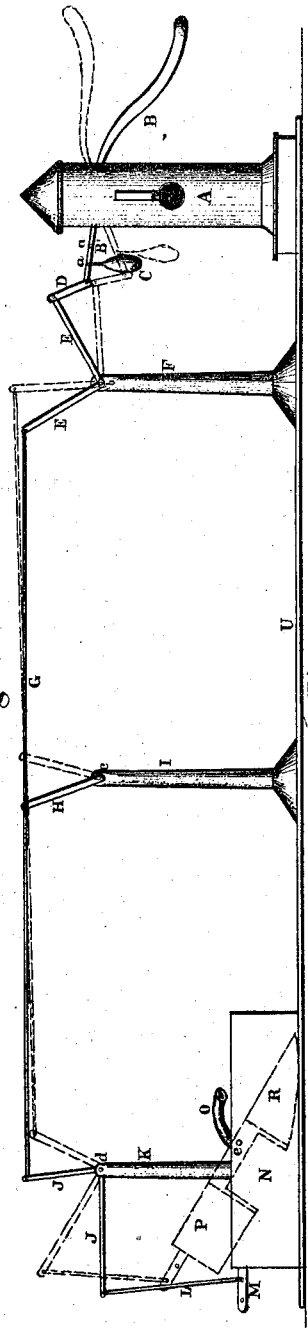
Figure 3:
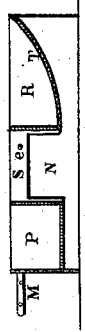

Figure 1 is a plan of my apparatus.
Figure 2 is a side view of the same.
Figure 3 is a section of water-lever.

My invention relates to the novel construction of apparatus for operating pumps for furnishing water for domestic or farming purposes, (where a small but constant supply of water is required,) by means of water power located within a moderate distance of the pump; and It consists in the combination of a vibrating counter-weighted water-lever with a train of rock-levers, tension-wire, and connecting link, and a weighted pump-lever, the several parts being so arranged that the water furnishing the power causes a vibration of the water-lever, which vibration, in connection with the action of the weight on the pump-lever, imparts the necessary movement to the pump-lever, and thus effects the required pumping, whereby I obtain a very cheap and simple apparatus, which can be applied in any location where a small water power can be had within a mile or more of the pump, and which will save a great amount of work for the farmer, as it is specially adapted to pumping water for stock and other like purposes.

To enable others skilled in the art to make and use my invention, I will proceed to describe its construction and operation.

The pump A, represented in the drawing, is of an ordinary form, and is provided with the pivoted pump-lever B, the end B' of which is extended out on the side of the pump next the pumping apparatus, and has the holes *a a* formed in it, by which the weight C can be secured to it, as shown.

The post F is fixed in the ground (which is represented by the platform U) near the pump A, and the bent rock-lever E E is pivoted by a bolt, *b*, to the head of this post.

The connecting link D is pivoted to the end B' of the pump-lever and to the arm of the rock-lever E E, as shown in figs. 1 and 2.

The tension-wire G extends from the other arm of the rock-lever E E to the arm of the rock-lever J J, which is pivoted on a bolt, *d*, at the head of a post, K, which is fixed in the ground near the pumping apparatus.

The water-lever M P R consists of the side pieces S S, between which are formed the counter-weight box P and the water-box R, as shown in figs. 1 and 3.

The arm M is secured to the rear of the box P, and is connected, by a rod, L, to the arm of the rock-lever J J, as shown in fig. 2, and the pivots *e e* are fixed in the side pieces S S, and work in boxes in the frame-pieces N N, as shown in figs. 1 and 2.

The cross-section of the box R is of a triangular form, as shown in fig. 3, and the bottom piece T is made in a concave form, as shown, the object being to hold the water in the box until the lever has fully completed its vibration, and then to allow a complete emptying of the box, so as to have little or no water to lift in the opposite vibration of the water-lever.

The water furnishing the power is brought onto the water-box R by means of a pipe or penstock, O, as indicated in fig. 2.

Now, to adjust the machine for operation, the counter-weight box P is filled with stone, or other heavy material, until it has sufficient weight to nearly counter-balance the water-box R when filled with water.

The weight C is then so adjusted on the end B' of the pump-lever as to have sufficient power to force down the pump-piston and to draw back the train D E G J J L, when the water-lever M P R is tilted by the filling of the water-box R.

If the parts are supposed to be in the positions shown by full lines in drawing, and the water be let on through the penstock O, it is evident that as soon as the water-box R is filled with water, the water-lever M P R will begin to turn on the pivots *e e*, and weight C on the pump-lever B will at the same time commence to fall, and the movement of the weight C, in connection with the tendency of the water-box R to retain the water, by reason of its curved bottom T, will cause these movements to continue until the parts are brought into the positions indicated by dotted lines in fig. 2.

When the parts have assumed this position, it is evident that all the water will be discharged from the water-box R; consequently the counter-weight box P can then act to turn the water-lever M P R back to its first position, which will draw back the train L J J G E E D, thus raising the pump-lever B and effecting one stroke of the pump-piston.

From the foregoing description, it is readily seen that all the strains on the wire G are tensional strains, consequently it need have no compressive capacity, and can be carried over hills and around corners for almost any desired distance in a manner similar to that used in bell-hanging for hotels or houses.

Where there is a long stretch of straight wire, it is conveniently supported, at intermediate points, by means of a straight arm, H, which is pivoted on a bolt, c, at the head of a post, I, which is fixed in the ground at the desired point.

Having thus fully described my improved apparatus,

What I claim therein as new and of my invention, and desire to secure by Letters Patent, is—

The combination of the vibrating water-lever P R, consisting of the counter-weight box P and water-box R, with curved bottom T, arm M, rod L, rock-lever J J, tension-wire G, rock-lever E E, link D, and pump-lever B, with back-weight C, the several parts being arranged and operating in the manner and for the purpose specified.

As evidence of the foregoing, witness my hand this 17th day of February, A. D. 1870.

DAVID STONER.

Witnesses:
JOB ABBOTT,
ANDREW CHOFFIN.